US009367491B2

(12) United States Patent
Chen et al.

(10) Patent No.: US 9,367,491 B2
(45) Date of Patent: Jun. 14, 2016

(54) METHOD AND APPARATUS FOR ON-THE-FLY LEARNING TRAFFIC CONTROL SCHEME

(71) Applicants: Chao Yu Chen, Hsinchu (TW);
Min-Jung Fan-Chiang, Hsinchu (TW);
Jung Chi Huang, Changhua County (TW)

(72) Inventors: Chao Yu Chen, Hsinchu (TW);
Min-Jung Fan-Chiang, Hsinchu (TW);
Jung Chi Huang, Changhua County (TW)

(73) Assignees: Global Unichip, Corp., Hsinchu (TW);
Taiwan Semiconductor Manufacturing Company Ltd., Hsinchu (TW)

( * ) Notice: Subject to any disclaimer, the term of this patent is extended or adjusted under 35 U.S.C. 154(b) by 257 days.

(21) Appl. No.: 14/144,617

(22) Filed: Dec. 31, 2013

(65) Prior Publication Data

US 2015/0186053 A1    Jul. 2, 2015

(51) Int. Cl.
*G06F 3/06*          (2006.01)
*G06F 13/16*         (2006.01)

(52) U.S. Cl.
CPC ............... *G06F 13/16* (2013.01); *G06F 3/061* (2013.01); *G06F 3/0638* (2013.01); *G06F 3/0673* (2013.01)

(58) Field of Classification Search
CPC ............ G06F 12/0806; G06F 12/0831; G06F 13/4022; G06F 13/4221; G06F 13/4286; G06F 8/71; G06F 9/466; G06F 12/084; G06F 13/372; G06F 3/0613; G06F 3/0673; G06F 3/0638; G06F 13/16; G06F 13/362
USPC .............. 711/130, E12.038, 105; 710/36, 38
See application file for complete search history.

(56) References Cited

U.S. PATENT DOCUMENTS

| | | | | |
|---|---|---|---|---|
| 5,379,379 A * | 1/1995 | Becker | ............... | G06F 13/1631 711/158 |
| 5,612,977 A * | 3/1997 | Ogoro | ....................... | H03J 7/02 329/306 |
| 6,032,232 A * | 2/2000 | Lindeborg | .............. | G06F 13/18 710/36 |
| 2003/0167381 A1* | 9/2003 | Herscovich | ......... | G06F 13/1605 711/151 |
| 2006/0200607 A1* | 9/2006 | Subramaniam Ganasan | ............... | G06F 13/362 710/113 |
| 2008/0209093 A1* | 8/2008 | Huang | .................. | G06F 13/362 710/107 |
| 2010/0169566 A1* | 7/2010 | Ooi | ......................... | G06F 3/061 711/112 |
| 2010/0281231 A1* | 11/2010 | Krishnan | .............. | G06F 13/161 711/167 |
| 2013/0091331 A1* | 4/2013 | Moraru | ................. | G06F 12/126 711/143 |
| 2013/0097363 A1* | 4/2013 | Tan | ..................... | G06F 12/0238 711/103 |

* cited by examiner

*Primary Examiner* — Tuan Thai
*Assistant Examiner* — Edward Waddy, Jr.
(74) *Attorney, Agent, or Firm* — Min-Lee Teng; Litron Patent & Trademark Office (57) ABSTRACT

The present invention discloses a method of arbitrating among a plurality of channels to access a resource, comprising the steps of: providing each channel an address back-to-back counter; assigning each address back-to-back counter an initial value and a pre-defined threshold, wherein the address back-to-back counter is updated according to the activities of back-to-back access to the resource by the channel; and providing each channel a contiguous window setting to define a number of contiguous times for the channel to access the resource; wherein a channel being served is to be served for contiguous times defined by the contiguous window setting of the channel if the address back-to-back counter value of the channel is higher than the pre-defined threshold of the channel.

20 Claims, 7 Drawing Sheets

Port1 Address :
20, 21, 22, 23, 24, 25, 26, 27, 28, 29, 2a, 2b, 2c, 2d, 2e, 2f, 30, 31   401

B2B address counter value
128 129 130 131 132 133 134 135 136 137 138 139 140 141 142 143 144 145   402

Threshold Met
F  F  F  F  F  F  F  F  F  F  T  T  T  T  T  T  T  T   403

Port CPU :
Address :      30,      40,      50   404

Actual series of addresses being serviced
20, 21, 22, 23, 30, 24, 25, 26, 40, 27, 28, 29, 2a, 2b, 2c, 2d, 2e, 2f, 50   405

FIG. 4A

Port1 Address :                                                              421

0,   4,   8,   c,   10,   14,   18,   1c,   20,   24,   28,   2c,   30,   34,   38,   3c B2B address counter value                                     422

128   129   130   131   132   133   134   135   136   137   138   139   140   141   142   143

Threshold Met                                                                    423

F   F   F   F   F   F   F   F   F   T   T   T   T   T   T   T Port2 Address :                                                       424

30,      40,      50

Actual series of addresses being serviced                   425

METHOD AND APPARATUS FOR ON-THE-FLY LEARNING TRAFFIC CONTROL SCHEME

BACKGROUND OF THE INVENTION

1. Field of the Invention

The invention relates in general to a memory channel access to a memory and, in particular, to memory channel traffic control when multiple memory channels are accessing the memory.

2. Description of the Prior Art

In a conventional arbiter design, only bandwidth requirements are taken into consideration when deciding arbitration weighting. However, address locality and contiguous factor are important factors to consider in order to reduce the overheads of pre-charge and processing time of active commands while a channel is accessing a memory module containing DRAM, or alike, devices.

Figure 1:
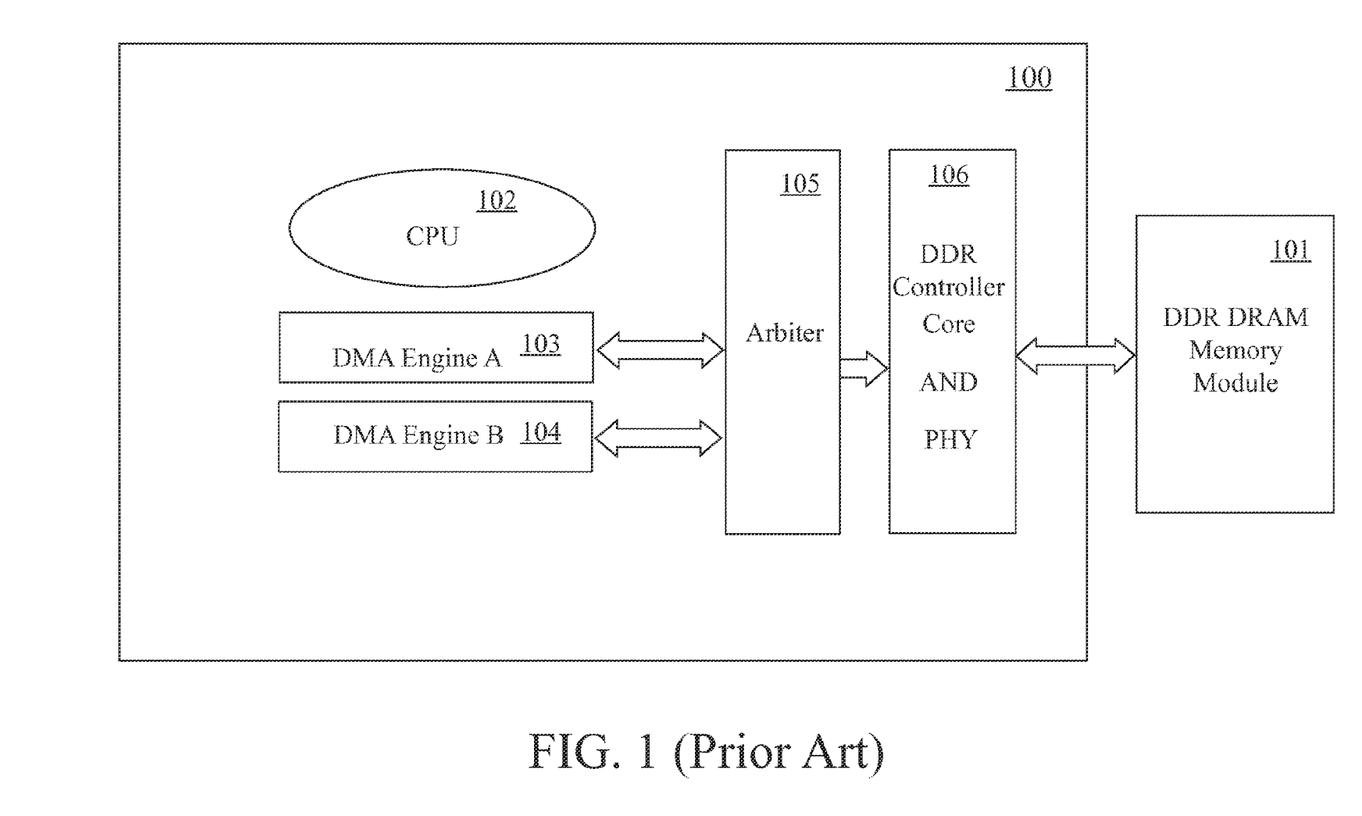
FIG. 1 illustrates a conventional traffic control algorithm used to arbitrate the user traffic to system memory.

Conventionally, as shown in FIG. 1, in a system-on-chip (SOC) 100, an arbiter 105 is used to arbitrate the traffic from CPU 102, DMA engine A 103 and DMA engine B 104 to a system memory such as DDR SDRAM module 101 through a DDR controller core and physical interface 106. A weighted-fair arbitration algorithm is often used by the arbiter 105 to share the system memory bandwidth among all the ports according to the weighted settings assigned for each port. However, the performance of memory accessing based on the weighted-fair arbitration algorithm will be degraded due to the fact that it needs to handle re-scheduling and out of order issues in order to optimize memory page hit rate when the memory is accessed by multiple channels concurrently.

Therefore, what is needed is a new arbitration scheme to obtain optimal page hit rate of the memory channel and to resolve the re-scheduling and out of order issues.

SUMMARY OF THE INVENTION

One purpose of this invention is to provide an on-the-fly scheme for the traffic control to arbitrate the traffic to obtain optimal page hit rate of the memory channel. In one embodiment, the on-the-fly scheme for high page hit rate can be integrated with an original bandwidth allocation algorithm to obtain the optimal memory channel performance.

In one embodiment, a method of arbitrating among a plurality of channels to access a resource, comprising the steps of: providing each channel an address back-to-back counter; assigning each address back-to-back counter an initial value and a pre-defined threshold, wherein the address back-to-back counter is updated according to the activities of back-to-back access to the resource by the channel; and providing each channel a contiguous window setting to define a number of contiguous times for the channel to access the resource; wherein a channel being served is to be served for contiguous times defined by the contiguous window setting of the channel if the address back-to-back counter value of the channel is higher than the pre-defined threshold of the channel.

In one embodiment, the method of arbitrating among a plurality of channels to access a memory module is applied to concurrent access to a memory module comprising DRAM devices.

In one embodiment, the method of arbitrating among a plurality of channels to access a resource is integrated with a weighted-fair algorithm and each channel is assigned a weighted value according to bandwidth requirement of each of the plurality of channels.

In one embodiment, a apparatus of arbitrating among a plurality of channels to access a resource, comprising: a plurality of address back-to-back counters, wherein each of the plurality of address back-to-back counters is associated with a channel of plurality of channels respectively, wherein each address back-to-back counter is assigned an initial value and a pre-defined threshold, wherein the address back-to-back counter is updated according to the activities of back-to-back access to the resource by the channel; and a contiguous window setting to define a number of contiguous times for a channel to access the resource; wherein a channel being served is to be served for contiguous times defined by the contiguous window setting of the channel if the address back-to-back counter value of the channel is higher than the pre-defined threshold of the channel.

With the brief description of drawings and detailed description of embodiment disclosed below, advantage, scope, and technical details of this invention are easy to be understood.

BRIEF DESCRIPTION OF DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF EMBODIMENT

The detailed explanation of the present invention is described as following. The described preferred embodiments are presented for purposes of illustrations and description, and they are not intended to limit the scope of the present invention. In this invention, a method of arbitrating among a plurality of channels to access a resource is disclosed. Compared with conventional arbitrating schemes, the disclosed arbitrating method provides a more optimized performance to increase the page hit rate.

Figure 2:
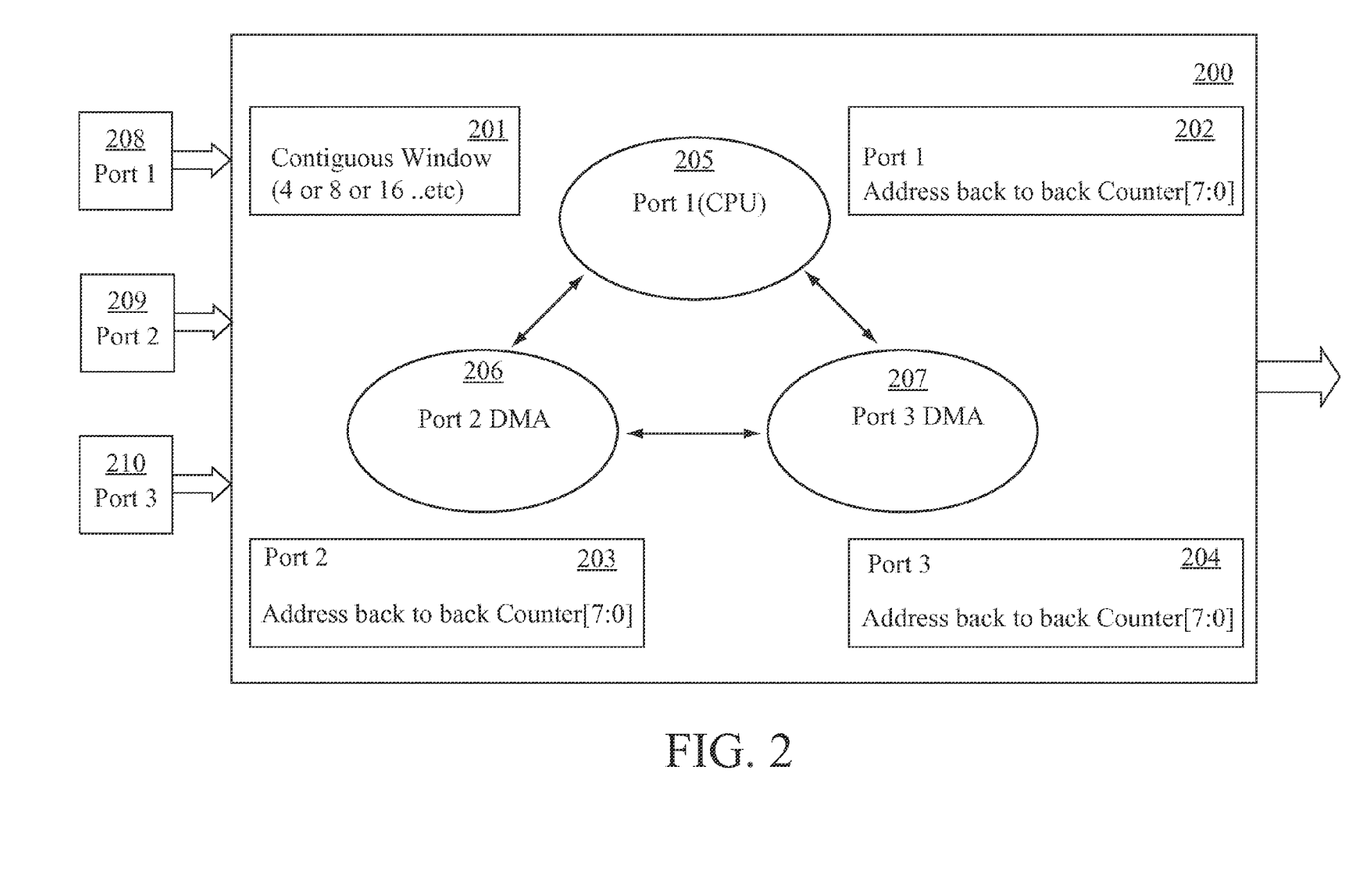
FIG. 2 illustrates a diagram for an arbiter with the on-the-fly learning scheme in accordance with one embodiment of this invention.

In one embodiment, please refer to FIG. 2 which illustrates a diagram 200 of an arbiter with the on-the-fly learning scheme according to one embodiment of current invention. As shown in FIG. 2, there are three ports connected to the arbiter for each channel to access the resource, such as a memory module. The port 1 208 is connected to a CPU; the port 2 209 is connected to a first DMA engine and the port 3 210 is connected to a second DMA engine. There are three address back-to-back counters, wherein the first back-to-back counter 202 is associated with the CPU port; the second back-to-back counter 203 is associated with the first DMA engine; and the third back-to-back counter 204 is associated with the second DMA engine. Each address back-to-back counter is assigned an initial value and a pre-defined threshold. The first back-to-back address counter 202 is updated according to the activities of back-to-back access to the resource by the CPU; the second back-to-back address counter 203 is updated according to the activities of back-to-back access to the resource by the first DMA engine; and the third back-to-back address counter 204 is updated according to the activities of back-to-back access to the resource by the second DMA engine. There is a contiguous window setting 201 for each port to define a number of contiguous times. The contiguous window setting 201 is used to define a number of contiguous times for a channel to access the resource. When a channel is in service, it will be served for contiguous times defined by the contiguous window setting of the channel if the address back-to-back counter value of the channel is higher than the pre-defined threshold of the channel.

Figure 3:
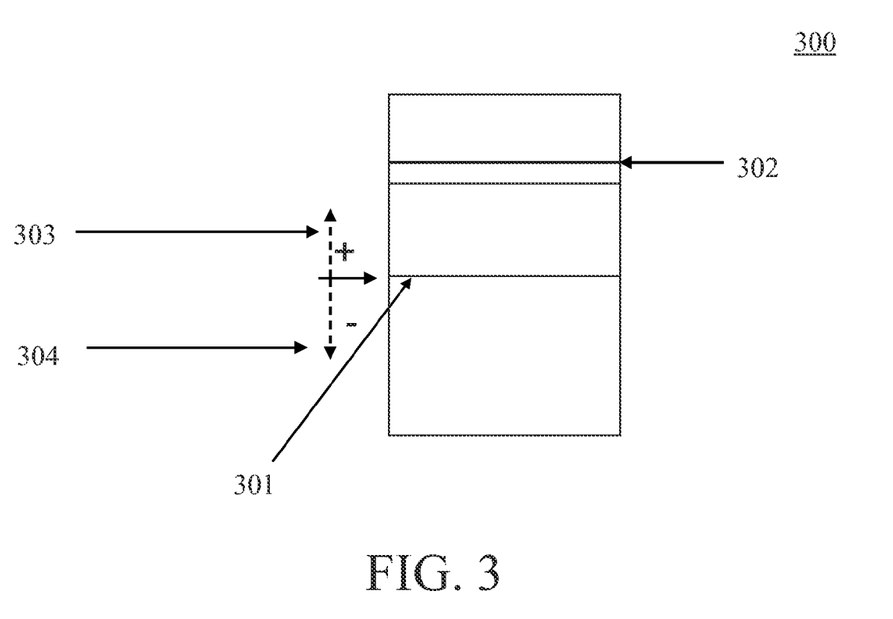
FIG. 3 illustrates an address back-to-back counter.

Please refer to FIG. 3 which illustrates an address back-to-back counter 300. In one embodiment, each address back-to-back counter is eight-bit wide and an initial value 301 of the address back-to-back counter is set to 128 (0b1000-0000) when power is on. In one embodiment, an address back-to-back counter of a channel is increased 303 when the current command is back-to-back access to the last command, generated for the channel. For example, if the beginning address of current command is 16 and the last address of the last command is 15, the address of the current command is contiguous to the address of the last command; therefore, the current command is a back-to-back access to the last command. On the other hand, in one embodiment, the address back-to-back counter is decreased 304 when the current command is not back-to-back access to the last command. As a result, the address back-to-back counter will record the back-to-back activities of a channel; and it will reach a threshold value 302 when the back-to-back access occurs frequently. Otherwise, it will stay below the threshold. If a channel tends to do back-to-back access frequently, the arbiter will allow it to do more back-to-back accesses to increase the page hit rate.

In one embodiment, each address back-to-back counter is stopped at 0b1111-1111 if overflow condition occurs; and each address back-to-back counter is stopped at 0b0000-0000 if underflow condition occurs. In one embodiment, the threshold value of each address back-to-back counter is set to 0b1111-1111 or 0b1100-0000. Please note that the width of the back-to-back address counter can be set according to the design so that the overflow conditions can only happen in certain particular scenarios.

The gratuity of the contiguous times of access can be defined in many ways according to design needs. For example, the gratuity of the contiguous times of access can be based on a cycle in which an address is accessed in the memory module, on a request in which multiple cycles are accessed within the request, or some other suitable ways. For any given channel, the back to back access means that the addresses generated for the port are contiguous within a time interval, and any non-contiguous address generated for the channel will stop the back to back access, and the back-to-back address counter will be updated according to the activities of the back-to-back access.

Figure 4A:
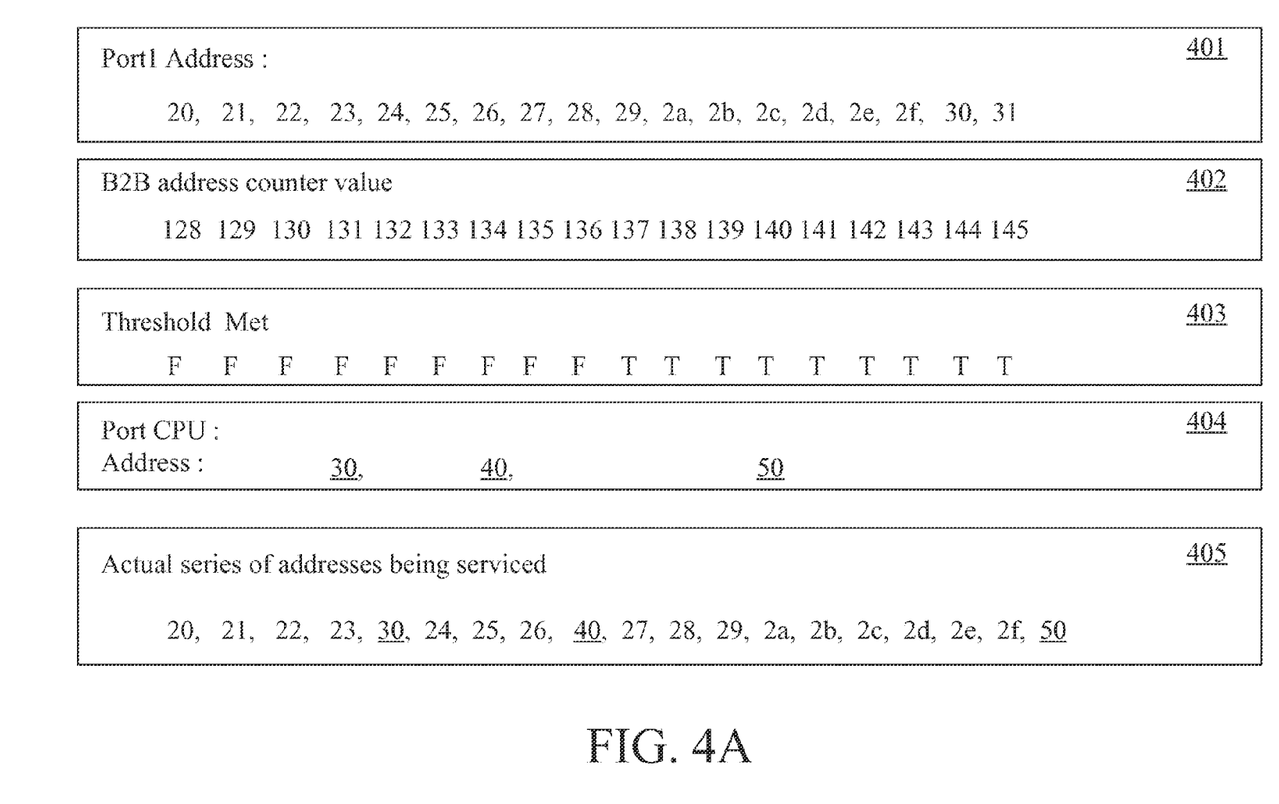
FIG. 4A illustrates access sequences from multiple ports based on 1 cycle gratuity.

For example, there is a sequence of DMA access from port 1 as shown in FIG. 4A. In one embodiment, the gratuity of the contiguous times of access can be the number of cycles that a channel is actually accessing the memory. The back-to-back address counter is initialized to 128 with a pre-defined threshold value 134. The contiguous window setting is 8. In the very beginning, the value of the back-to-back address counter of port 1 is below threshold, the first series of address, as shown in block 401, are 20, 21, 22, 23, 24, 25, 26, 27, 28, 29, 2a, 2b, 2c, 2d, 2e, 2f. After the address 29 is serviced, the back-to-back address counter will increase by 9 and the value of the back-to-back address counter now equals to 135 as shown in block 402, which is over the pre-defined threshold, and the threshold met will be true as shown in block 403. At this time, the port 1 is to be serviced for a contiguous of times set by the contiguous time window, which is 8 times of contiguous accesses, without being interrupted by the access request from CPU port. When the value of the back-to-back address counter is below the threshold, the CPU port will interrupt the port 1 access. For example the address 30 and 40, as shown in block 403, will be serviced between the addresses of the port 1, as shown in the actual accesses patterns shown in block 405. However, the address 50, as shown in block 404, of CPU port will be delayed until the port 1 finishes the address 2f because the port 1 being serviced is to be serviced for a contiguous of times set by the contiguous time window, which is 8 times of contiguous accesses, without being interrupted by CPU port or another port. Accordingly, the actual series of addresses being serviced are shown in block 405.

Figure 4B:
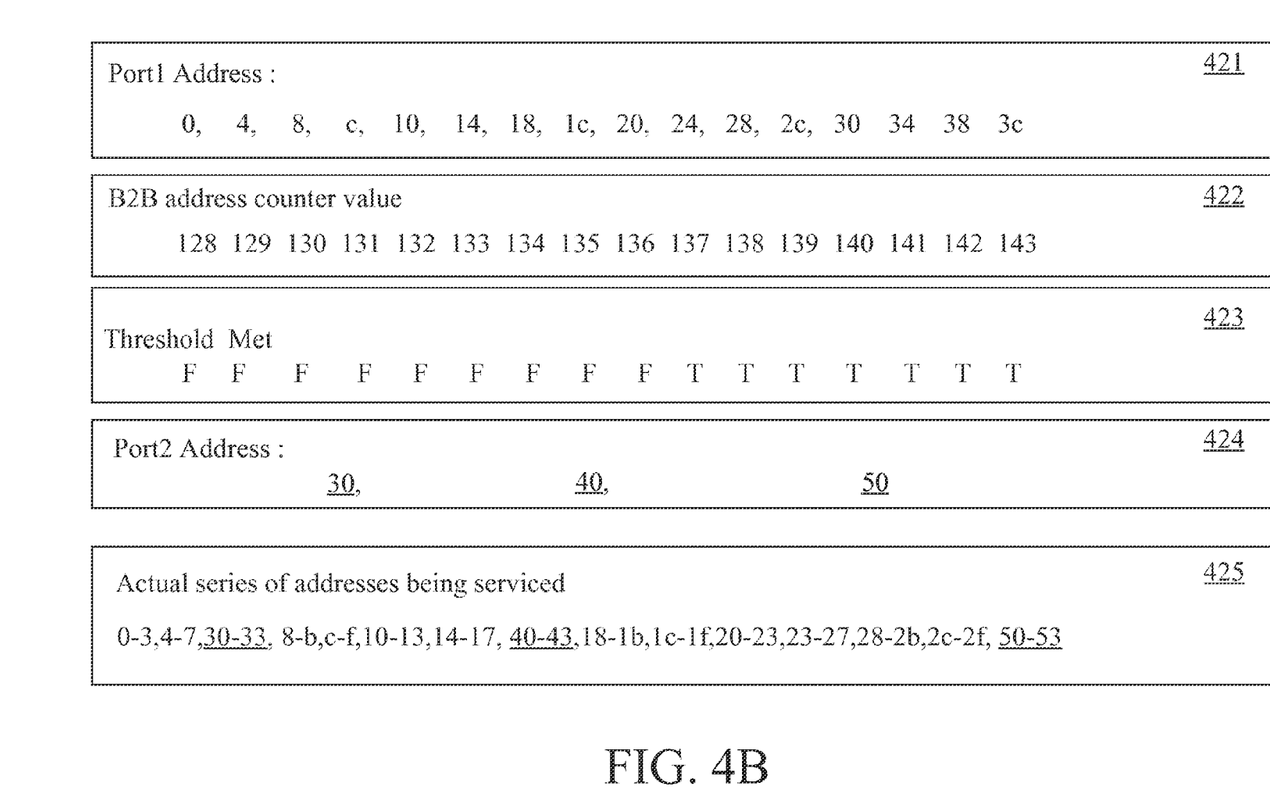
FIG. 4B illustrates access sequences from multiple ports based on 4-cycle gratuity.

In another embodiment, the gratuity of the contiguous times of access can be the number of times that the channel is granted to access the memory as shown in FIG. 4B.

In each granted access, there are multiple cycles for the channel to access the memory continuously, such as a DMA with 4 cycles in a single granted access. The back-to-back address counter is initialized to 128 with a pre-defined threshold value 134. The contiguous window setting is 8. In the very beginning, the value of the back-to-back address counter of port 1 is below threshold, the first series of address, as shown in block 421, are 0-3,4-7,8-b,c4,10-13,14-17,18-1b,1c-1f, 20-23, 23-27, 28-2b, 2c-2f. After the address 23-27 is serviced, the back-to-back address counter will increase by 9 and the value of the back-to-back address counter now equals to 135 as shown in block 422, which is over the threshold, and the threshold met will be true as shown in block 423. At this time, the port 1 being serviced is to be serviced for a contiguous of times set by the contiguous time window, which is 8 times of contiguous accesses, without being interrupt by the access request from port 2. When the value of the back-to-back address counter is below the threshold, the port 2 will interrupt the port 1 for accessing the memory. For example the address 3-33 and 40-43, as shown in block 424, will be serviced between the addresses of the port 1, as shown in the actual series of addresses being serviced are shown in block 425. However, the address 50-53 of port 2, as shown in block 424, will be delayed until the port 1 finishes the address 2f because the port 1 being serviced is to be serviced for a contiguous of times set by the contiguous time window, which is 8 times of contiguous accesses, without being interrupted by port 2 as shown in the actual series of addresses being serviced are shown in block 425.

In one embodiment, a method of arbitrating among a plurality of channels to access a resource, comprising the steps of: providing each channel an address back-to-back counter; assigning each address back-to-back counter an initial value and a pre-defined threshold, wherein the address back-to-back counter is updated according to the activities of back-to-back access to the resource by the channel; and providing each channel a contiguous window setting to define a number of contiguous times for the channel to access the resource; wherein a channel being served is to be served for contiguous times defined by the contiguous window setting of the channel if the address back-to-back counter value of the channel is higher than the pre-defined threshold of the channel.

Figure 5:
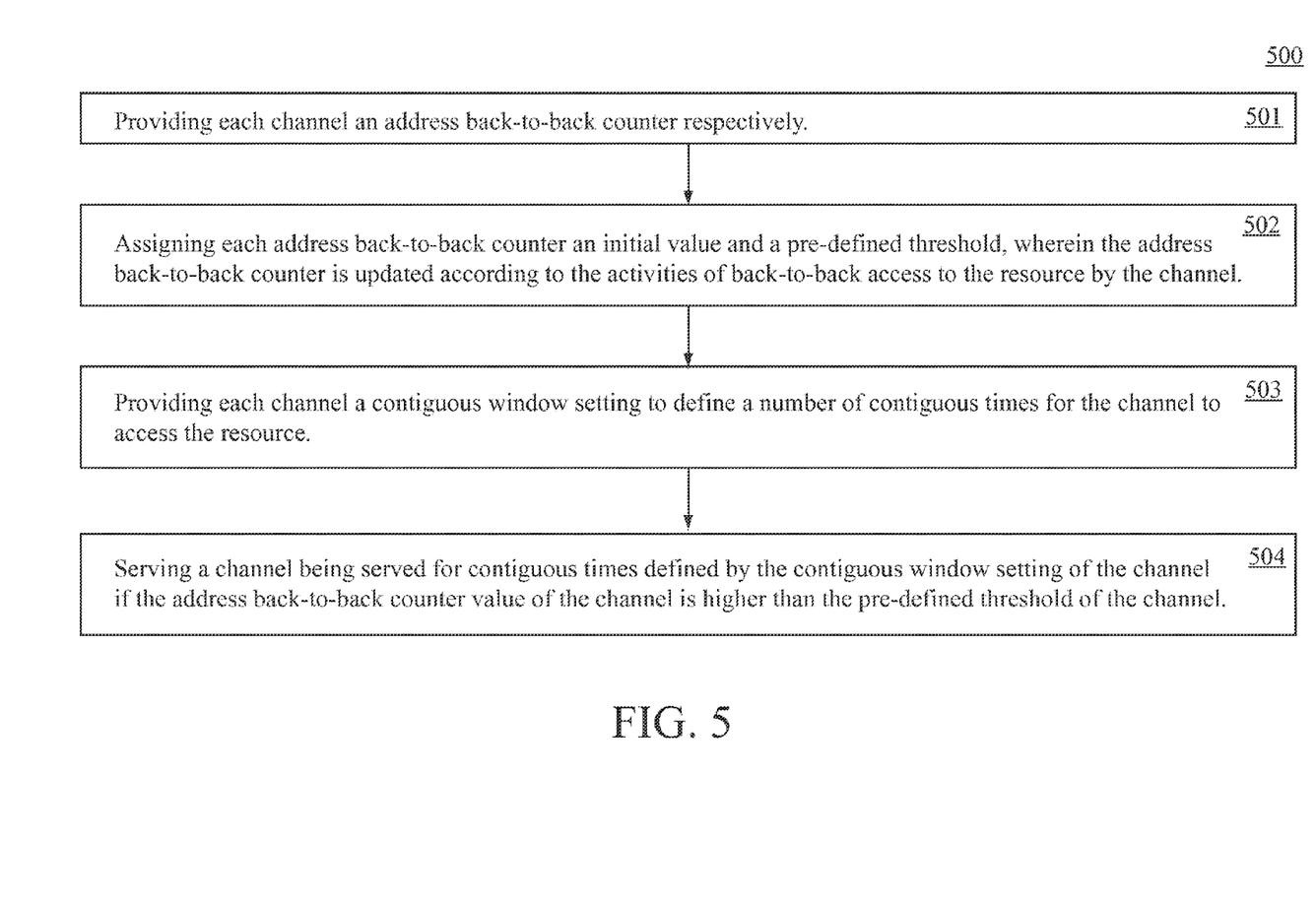
FIG. 5 illustrates a flow chart of arbitrating among a plurality of channels according to one embodiment of this invention.

Please refer to FIG. 5 which illustrates a flow chart 500 of arbitrating among a plurality of channels according to one embodiment of this invention, in step 501, an address back-to-back counter is provided for each channel respectively; in step 502, assign each address back-to-back counter an initial value and a pre-defined threshold, wherein each address back-to-back counter is updated according to the activities of back-to-back access to the resource by a corresponding channel respectively; in step 503, provide each channel a contiguous window setting to define a number of contiguous times for the channel to access the resource; in step 504, a channel being served is to be served for contiguous times defined by the contiguous window setting of the channel if the address back-to-back counter value of the channel is higher than the pre-defined threshold of the channel. The method of arbitrating among a plurality of channels to access a resource according to above steps, wherein the resource is a memory module, wherein the memory module comprising DDR SDRAM devices. In one embodiment, a contiguous window can be shared among all the ports or channels for allowing contiguous times of back-to-back access for each channel. In one embodiment, each port or channel can have its own contiguous window so that more flexibility can be provided.

Figure 6:
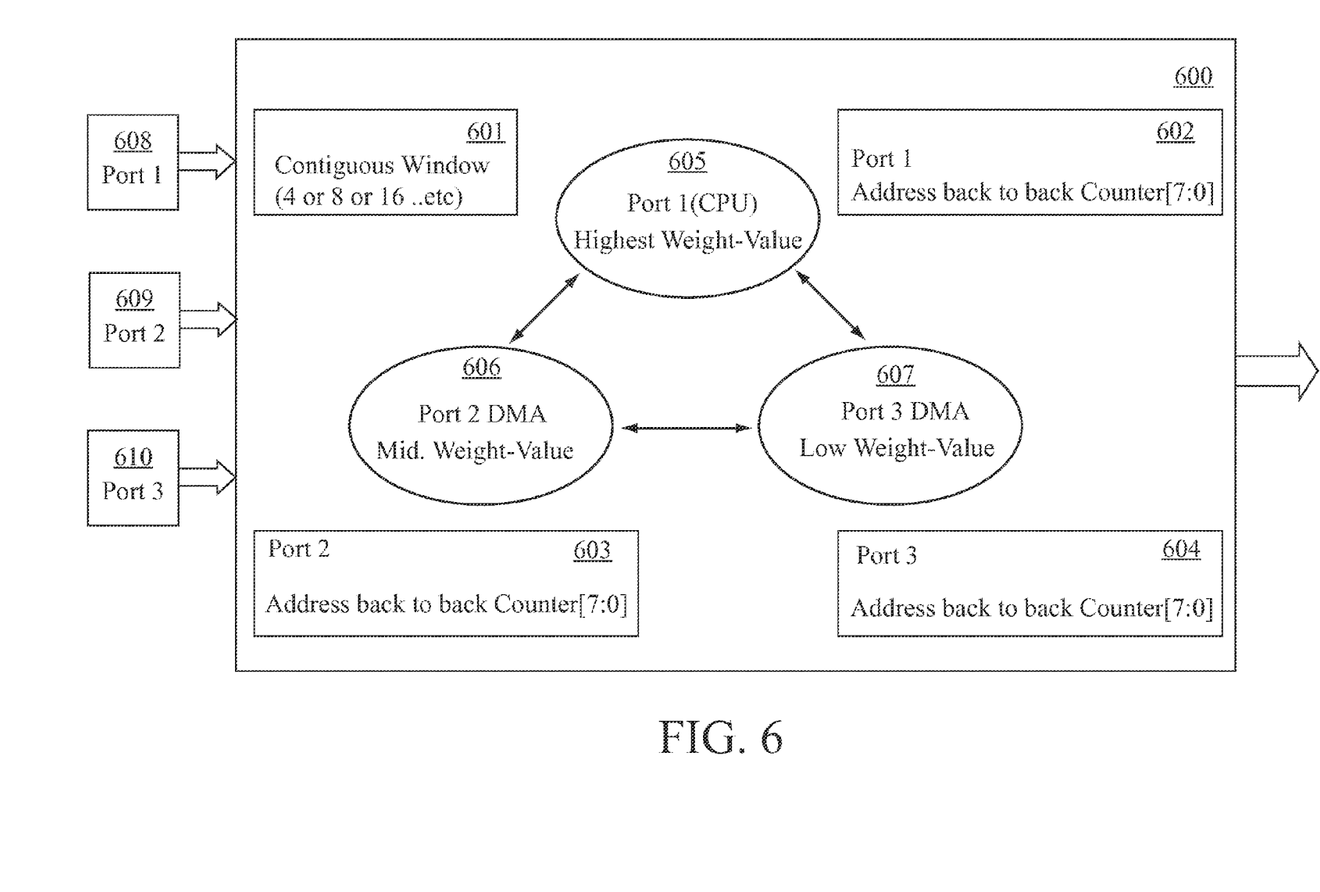
FIG. 6 illustrates a diagram for an arbiter which integrates a weighted-fair scheduling with the on-the-fly learning scheme in accordance with one embodiment of this invention.

In one embodiment, please refer to FIG. 6 which illustrates a diagram of an arbiter 600 which integrates a weighted-fair scheduling with the on-the-fly learning scheme according to one embodiment of current invention. As shown in FIG. 6, there are three ports 608, 609 and 610 which are connected to the arbiter. There are three address back-to-back counters, wherein the first back-to-back counter 602 is associated with the CPU port; the second back-to-back counter 603 is associated with the first DMA engine; and the third back-to-back counter 604 is associated with the second DMA engine. Each address back-to-back counter is assigned an initial value and a pre-defined threshold. The first back-to-back address counter 602 is updated according to the activities of back-to-back access to the resource by the CPU; the second back-to-back address counter 603 is updated according to the activities of back-to-back access to the resource by the first DMA engine; and the third back-to-back address counter 604 is updated according to the activities of back-to-back access to the resource by the second DMA engine. There is a contiguous window setting 601 for each port to define a number of contiguous times for each channel to access the resource, such as a memory module. The port 1 is connected to a CPU which is assigned with a highest weighted value as shown in circle 605; the port 2 is connected to a first DMA engine which is assigned with a middle weighted value as shown in circle 606; and the port 2 is connected to a second DMA which is assigned with a lowest weighted value as shown in circle 607. The weighted value can be assigned to each port according to the bandwidth requirement of each port. When a channel is in service, the channel can be allowed to access a contiguous times in an arbitration scheme in which weighted-fair queuing is integrated with the on-the-fly learning scheme. That is, in weighted-fair queuing with a leaky bucket scheme to control the bandwidth, the credits of the leaky bucket will be increased one by one based on a time interval, and the credits of the leaky bucket can be deducted by the value of the contiguous time window after the channel completes the memory access based on the on-the-fly traffic control scheme.

In one embodiment, a contiguous window can be shared among all the ports or channels for allowing contiguous times of back-to-back access for each channel. In one embodiment, each port or channel can have its own contiguous window so that more flexibility can be provided.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A method of arbitrating among a plurality of channels to access a resource, comprising the steps of:
    providing each channel of the plurality of channels an address back-to-back counter respectively, wherein each address back-to-back counter is assigned to a corresponding requester of the channel;
    assigning each address back-to-back counter an initial value and a pre-defined threshold, wherein each address back-to-back counter is updated according to the activities of back-to-back access from the corresponding requestor of the address back-to-back counter to the resource;
    providing a contiguous window setting to define a number of contiguous times for a channel to access the resource; and
    serving a channel being served for additional contiguous times defined by the contiguous window setting of the channel when the address back-to-back counter value of the channel being served is higher than the pre-defined threshold of the channel.

2. The method according to claim 1, wherein the resource is a memory module.

3. The method according to claim 2, wherein the memory module comprising DDR SDRAM devices.

4. The method according to claim 1, wherein each channel is assigned a weighted value according to bandwidth requirement of each of the plurality of channels.

5. The method according to claim 1, wherein each address back-to-back counter is eight-bit wide and the initial value of the address back-to-back counter is set to 128 (0b1000-0000) when power is on.

6. The method according to claim 1, wherein each address back-to-back counter is increased by one when the current command is back-to-back access to the last command.

7. The method according to claim 1, wherein each address back-to-back counter is decreased by one when the current command is not back-to-back access to the last command.

8. The method according to claim 5, each address back-to-back counter is stopped at 0b1111-1111 if overflow condition occurs.

9. The method according to claim 5, wherein each address back-to-back counter is stopped at 0b0000-0000 if underflow condition occurs.

10. The method according to claim 5, wherein the threshold value of each address back-to-back counter is set to 0b1111-1111 or 0b1100-0000.

11. The method according to claim 1, the number of contiguous times of the contiguous window setting is one of 4, 8 and 16.

12. An apparatus of arbitrating among a plurality of channels to access a resource, comprising:
    a plurality of address back-to-back counters, wherein each of the plurality of address back-to-back counters is associated with a channel of plurality of channels respectively, wherein each address back-to-back counter is assigned an initial value and a pre-defined threshold, wherein each address back-to-back counter is assigned to a corresponding requester of the channel and is updated according to the activities of back-to-back access from the corresponding requestor of the address back-to-back counter to the resource; and a contiguous window setting to define a number of contiguous times for a channel to access the resource;

wherein a channel being served is to be served for additional contiguous times defined by the contiguous window setting of the channel when the address back-to-back counter value of the channel being served is higher than the pre-defined threshold of the channel.

13. The apparatus according to claim 12, wherein the resource is a memory module.

14. The apparatus according to claim 13, wherein the memory module comprising DDR SDRAM devices.

15. The apparatus according to claim 12, wherein each channel is assigned a weighted value according to bandwidth requirement of each of the plurality of channels.

16. The apparatus according to claim 12, wherein each address back-to-back counter is eight-bit wide and the initial value of the address back-to-back counter is set to 128 (0b1000-0000) when power is on.

17. The apparatus according to claim 12, wherein each address back-to-back counter is increased by one when the current command is back-to-back access to the last command.

18. The apparatus according to claim 16, each address back-to-back counter is stopped at 01111-1111 if overflow condition occurs.

19. The apparatus according to claim 16, wherein each address back-to-back counter is stopped at 0b0000-0000 if underflow condition occurs.

20. The apparatus according to claim 16, wherein the threshold value of each address back-to-back counter is set to 0b1111-1111 or 0b1100-0000.

* * * * *